United States Patent
Stamper, III et al.

(10) Patent No.: US 7,673,824 B2
(45) Date of Patent: Mar. 9, 2010

(54) DRINK MAKER

(75) Inventors: George William Stamper, III, Quinton, VA (US); Benjamin Henry Branson, III, Mechanicsville, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 1085 days.

(21) Appl. No.: 11/311,969

(22) Filed: Dec. 20, 2005

(65) Prior Publication Data
US 2007/0137492 A1 Jun. 21, 2007

(51) Int. Cl.
B02C 23/00 (2006.01)
(52) U.S. Cl. .................. 241/97; 241/282.2; 366/205
(58) Field of Classification Search .................. 241/74, 241/97, 282.1, 282.2; 99/510, 513; 366/205
See application file for complete search history.

(56) References Cited

U.S. PATENT DOCUMENTS

| | | | |
|---|---|---|---|
| 1,015,246 A * | 1/1912 | Peters | 241/49 |
| 1,431,422 A | 10/1922 | Randecker | |
| 1,874,079 A | 8/1932 | Black | |
| 1,951,684 A | 3/1934 | Wells | |
| 2,070,545 A | 2/1937 | Gilbert | |
| 2,090,578 A * | 8/1937 | Eppenbach | 241/65 |
| 2,099,739 A * | 11/1937 | Jenkins | 100/96 |
| 2,311,379 A | 2/1943 | Gillanders | |
| 2,315,018 A | 3/1943 | Lawrence | |
| 2,390,579 A | 12/1945 | Fritzberg | |
| 2,424,726 A | 7/1947 | Wells | |
| D160,523 S | 10/1950 | Oakmont | |
| 2,646,223 A | 7/1953 | Quintilian | |
| 2,665,852 A | 1/1954 | Shively | |
| 2,840,318 A | 6/1958 | Schnell | |
| D183,177 S | 7/1958 | Oertli | |
| 2,930,596 A * | 3/1960 | Waters | 366/279 |
| 2,945,634 A | 7/1960 | Beck et al. | |
| 2,985,389 A | 5/1961 | Williems | |
| 3,100,588 A | 8/1963 | Pearson, Jr. | |
| 3,313,332 A * | 4/1967 | Fritz et al. | 241/98 |
| D208,082 S | 7/1967 | Falkenberg | |
| D209,915 S | 1/1968 | Bentley | |
| 3,493,215 A | 2/1970 | Edwards et al. | |
| 3,552,663 A | 1/1971 | Royals | |

(Continued)

FOREIGN PATENT DOCUMENTS

GB 764361 12/1956

(Continued)

Primary Examiner—Bena Miller
(74) Attorney, Agent, or Firm—Panitch Schwarze Belisario & Nadel LLP

(57) ABSTRACT

A drink maker for processing foodstuff and dispensing the processed foodstuff therefrom. A base encloses a motor and a jar including a first recirculation surface is removably mountable to the base. A processing cup including a second recirculation surface is removably mountable to the jar and the jar and processing cup comprise a container in an assembled configuration. A recirculation chamber is defined by the first and second recirculation surfaces. The base includes an arcuate-shaped mounting wall extending from its top surface and the jar includes a skirt having a first wall and a second wall positioned radially outwardly from the first wall. The first and second walls define a mounting gap and the mounting wall is positioned in the mounting gap in the assembled configuration.

32 Claims, 11 Drawing Sheets

U.S. PATENT DOCUMENTS

| | | | |
|---|---|---|---|
| 3,566,939 A | 3/1971 | Hubrich | |
| 3,596,692 A | 8/1971 | Swanke | |
| 3,606,274 A | 9/1971 | Nelson | |
| 3,623,523 A | 11/1971 | Meyer et al. | |
| 3,920,224 A | 11/1975 | Fassauer | |
| 4,030,707 A | 6/1977 | Moreton | |
| 4,113,190 A | 9/1978 | Fudman | |
| 4,194,697 A * | 3/1980 | Lembeck | 241/92 |
| 4,201,487 A | 5/1980 | Backhaus | |
| 4,488,664 A | 12/1984 | Cleland | |
| 4,506,601 A | 3/1985 | Ramirez et al. | |
| 4,513,688 A | 4/1985 | Fassauer | |
| 4,537,332 A | 8/1985 | Brown et al. | |
| 4,555,984 A * | 12/1985 | Yamashita | 99/286 |
| 4,577,975 A | 3/1986 | McCrory et al. | |
| 4,773,599 A | 9/1988 | Lynch et al. | |
| 4,889,248 A | 12/1989 | Bennett | |
| D310,932 S | 10/1990 | Misubayashi | |
| 5,007,591 A | 4/1991 | Daniels, Jr. | |
| 5,065,672 A | 11/1991 | Federighi, Sr. | |
| 5,184,783 A | 2/1993 | Hockmeyer et al. | |
| 5,222,430 A * | 6/1993 | Wang | 99/512 |
| 5,257,575 A | 11/1993 | Harrison et al. | |
| 5,479,851 A | 1/1996 | McClean et al. | |
| 5,613,430 A | 3/1997 | Lee | |
| 5,636,923 A | 6/1997 | Nejat-Bina | |
| 5,662,032 A | 9/1997 | Baratta | |
| 5,690,021 A | 11/1997 | Grey | |
| D387,948 S | 12/1997 | Leverrier | |
| 5,795,062 A | 8/1998 | Johnson | |
| 6,050,180 A | 4/2000 | Moline | |
| 6,135,019 A | 10/2000 | Chou | |
| 6,223,652 B1 | 5/2001 | Calia et al. | |
| 6,499,873 B1 * | 12/2002 | Chen | 366/197 |
| 6,527,212 B2 | 3/2003 | Rupp | |
| 6,527,433 B2 | 3/2003 | Daniels, Jr. | |
| 6,536,335 B1 | 3/2003 | Ashworth | |
| D473,099 S | 4/2003 | Yamamoto et al. | |
| D473,421 S | 4/2003 | Daniels, Jr. | |
| 6,543,340 B1 | 4/2003 | Fouquet | |
| D474,065 S | 5/2003 | Daniels, Jr. | |
| D474,067 S | 5/2003 | Daniels, Jr. | |
| D474,643 S | 5/2003 | Daniels, Jr. | |
| 6,595,121 B1 | 7/2003 | Chang Chien | |
| D478,242 S | 8/2003 | Garman | |
| D483,607 S | 12/2003 | Chang Chien | |
| D485,728 S | 1/2004 | Sham et al. | |
| 6,758,592 B2 | 7/2004 | Wulf et al. | |
| 6,792,849 B1 * | 9/2004 | Kim | 99/348 |
| 6,817,750 B1 * | 11/2004 | Sands | 366/205 |
| D504,277 S | 4/2005 | Hei | |
| 6,966,689 B2 | 11/2005 | Daniels, Jr. | |
| 7,185,837 B2 * | 3/2007 | Oliver et al. | 241/282.1 |
| 2003/0099154 A1 | 5/2003 | Daniels, Jr. | |
| 2003/0193833 A1 | 10/2003 | Wulf et al. | |
| 2005/0018534 A1 | 1/2005 | Nikkah | |
| 2005/0045671 A1 | 3/2005 | Beesley et al. | |
| 2005/0068846 A1* | 3/2005 | Wulf et al. | 366/199 |
| 2005/0185507 A1 | 8/2005 | Beesley et al. | |
| 2005/0199534 A1 | 9/2005 | Daniels, Jr. | |
| 2005/0207270 A1 | 9/2005 | Beesley | |

FOREIGN PATENT DOCUMENTS

| | | |
|---|---|---|
| JP | 2004/113278 | 4/2004 |
| JP | 2004/357752 | 12/2004 |
| WO | WO 03/001954 A1 | 1/2003 |
| WO | WO 2004/080252 A1 | 9/2004 |

* cited by examiner

DRINK MAKER

BACKGROUND OF THE INVENTION

The present application is directed to a drink maker for processing foodstuff and dispensing the processed foodstuff from the drink maker. More particularly, the present application is directed to a drink maker that is able to dispense foodstuff from a spout and includes a recirculation chamber between a processing cup and a jar for circulating foodstuff into the path of a rotating impeller.

Blenders are a relatively common household or kitchen appliance that are used to blend foodstuff, typically drinks, or other foodstuff that is blended, processed or ground into a semi-fluid state. A typical blender includes a base that encloses a motor housing and a container comprised of a collar and a jar. The collar includes a blending tool rotatably mounted thereto and is typically mounted between the jar and motor housing in an assembled configuration. The blending tool is rotatably engageable with a drive shaft of the motor in the assembled configuration. A foodstuff is placed into the container and the collar is engaged with the base. Due to the symmetrical nature of the jar and the impeller, which is centrally located in a base of the jar, a vortex may be created within the container during blending. The vortex may prevent consistent blending or processing of the foodstuff within the container because all of the foodstuff may not come into contact with the rotating impeller. The foodstuff is blended and the container is removed from the base to dispense or pour the blended foodstuff from the mouth of the jar.

It would be desirable to mix a drink or process foodstuff in the container and dispense the processed drink or foodstuff directly into a cup or other receptacle without removing the container from the base or the lid from the mouth of the container. Additional foodstuff may then be inserted into the container and processed for continuous dispensing of the foodstuff from the container, without removing the container from the base. In addition, eliminating the step of removing the container from the base to dispense the processed foodstuff, in certain situations, eliminates the need to continuously replace the container onto the base to process additional foodstuff. Further, a user is not required to tip and pour processed foodstuff out of the mouth of the relatively heavy container when the foodstuff is dispensed from the dispensing spout.

It would also be desirable to reduce the inconsistent processing, mixing or blending of the foodstuff when a vortex forms within the container or a drink mixer and to include a safety interlock for the container that permits use of the device when the container is properly mounted on the motor housing, but generally prevents actuation of the motor when the container is not properly mounted to the housing. The inconsistent processing, mixing or blending of foodstuff may result in an uneven consistency in the processed foodstuff, which is generally undesirable to a user. In addition, operating the drink mixer when the container is improperly mounted on the motor housing or when the container is not mounted on the housing at all may create a safety hazard.

Further, manufacturers are continuously attempting to improve the performance of kitchen or blender-like appliances by various methods including tool operating speeds, tool geometry, container geometry and other methods. It would be desirable to further improve consistency and efficiency of the drink mixers or kitchen appliances by recirculating foodstuff through the rotating path of the impeller such that the consistency of the processed, mixed or blended foodstuff is relatively even throughout the container at the conclusion of processing.

BRIEF SUMMARY OF THE INVENTION

Briefly stated, a preferred embodiment of the present invention is directed to a drink maker for processing foodstuff and dispensing the processed foodstuff therefrom. The drink maker includes a base enclosing a motor and a jar removably mountable to the base. The jar includes a first recirculation surface. A processing cup is removably mountable to the jar and the processing cup and jar comprise a container in an assembled configuration. The processing cup includes a second recirculation surface. A recirculation chamber is defined by the first recirculation surface and the second recirculation surface.

In another aspect, a preferred embodiment of the present application is directed to a drink maker for processing foodstuff and dispensing the processed foodstuff therefrom. The drink maker includes a base enclosing a motor and a processing cup removably mountable to the base. The base includes an arcuate-shaped mounting wall extending from a top surface. A jar is removably mountable to the processing cup. The jar includes a mouth, a base end and a skirt proximate the base end. The skirt includes a first wall and a second wall wherein the second wall is positioned radially outwardly from the first wall. The first and second walls define a mounting gap therebetween. The mounting wall is positioned in the mounting gap in an assembled configuration.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
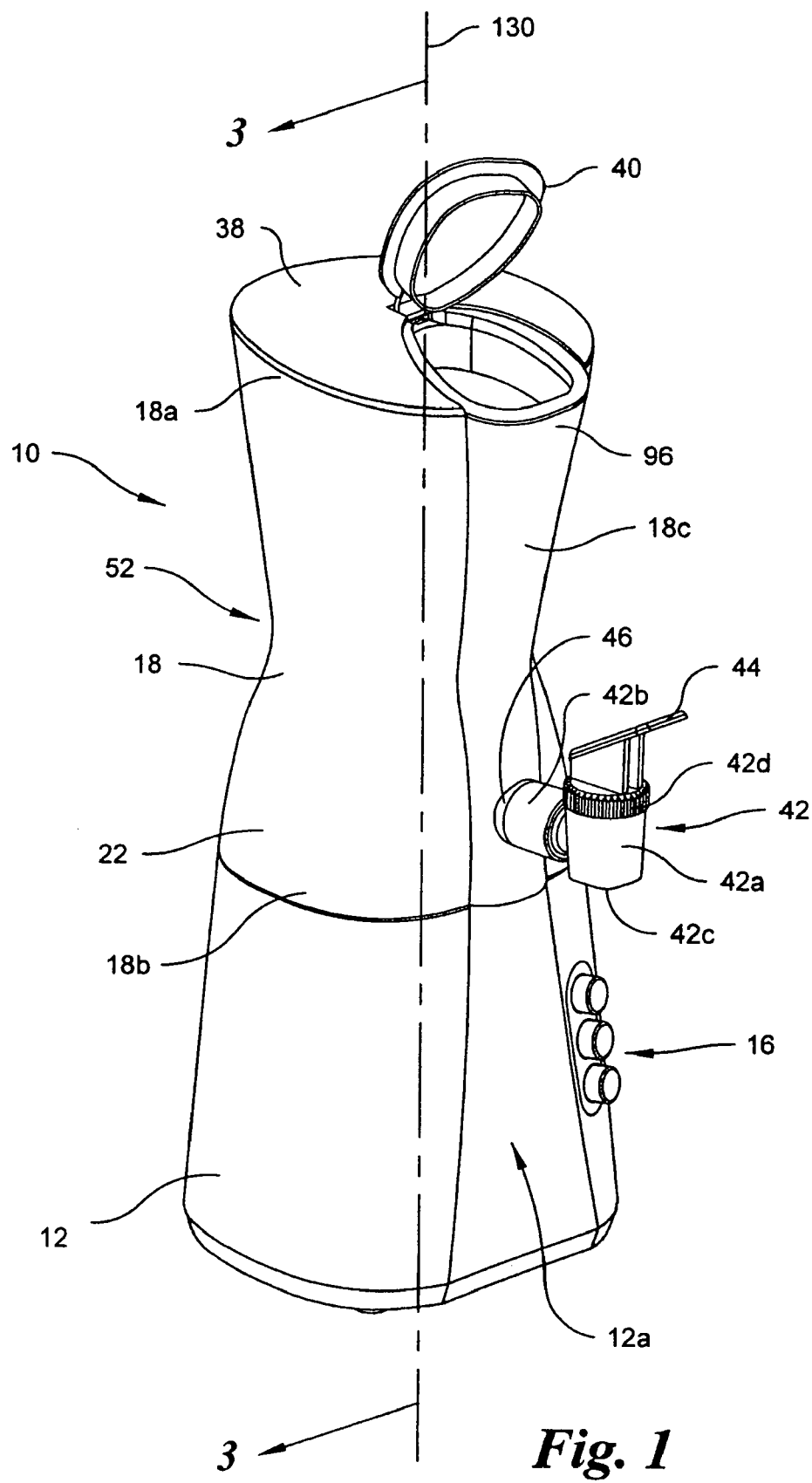
FIG. 1 is a top perspective view of a preferred embodiment of the drink maker of the present invention.

Certain terminology is used in the following description for convenience only and is not limiting. The words "right", "left", "lower" and "upper" designate directions toward and away from, respectively, the geometric center of the drink maker and designated parts thereof. The terminology includes the above-listed words, derivatives thereof and words of similar import.

Referring to the drawings in detail, wherein like numerals indicate like elements throughout, there is shown in FIGS. 1-8 a preferred embodiment of a drink maker, generally designated 10, for processing or blending foodstuff and dispensing the processed or blended foodstuff therefrom.

Figure 2:
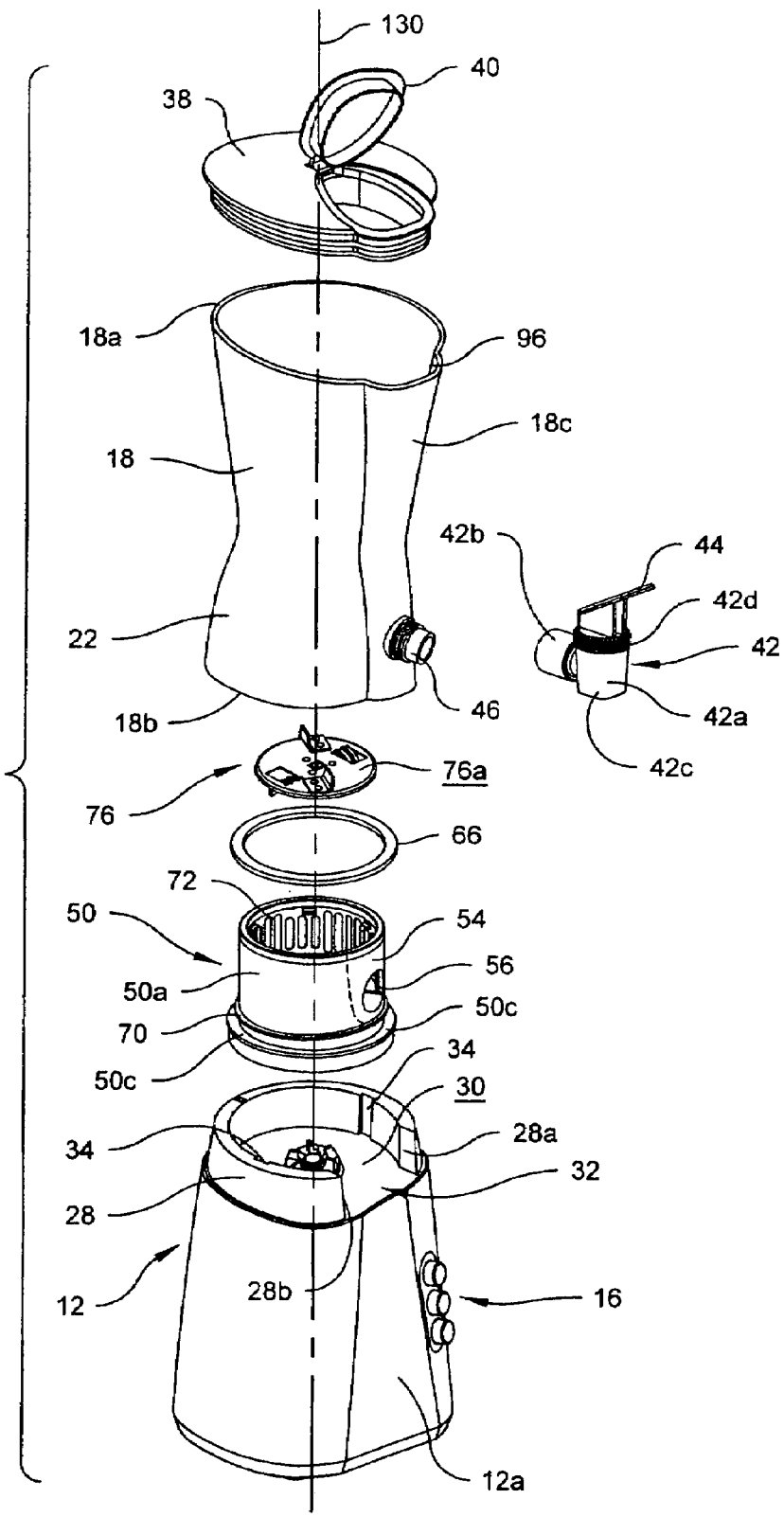
FIG. 2 is a partially exploded top perspective view of the drink maker shown in FIG. 1.
Figure 3:
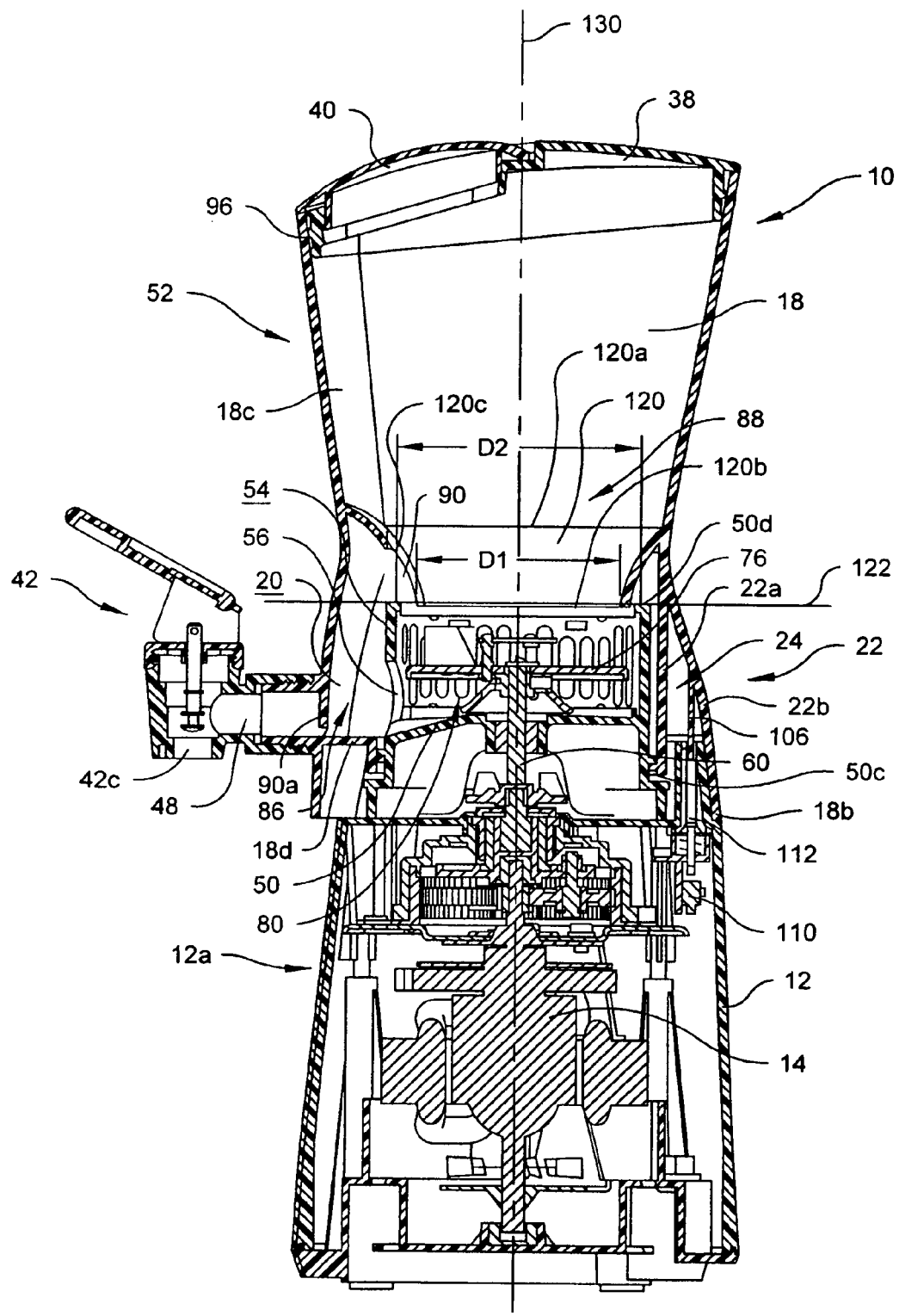
FIG. 3 is a cross-sectional view of the drink maker shown in FIG. 1, taken along line 3-3 of FIG. 1.

Referring to FIGS. 1-3, in the preferred embodiment, the drink maker 10 includes a base 12 enclosing a motor 14. The motor 14 is preferably an electric motor, which is typical in the appliance art, but is not so limited. The motor 14 may be comprised of nearly any drive mechanism that is able to power the drink maker 10 for processing or blending foodstuff. The base 12 is preferably a housing that encloses the motor and is also typical in the appliance art. The base 12 is preferably constructed of a polymeric material having an outer surface that is relatively smooth, continuous and resistant to stains produced by typical foodstuff that will be processed or blended. The base 12 preferably includes one or more control buttons 16 on a front face to control operation of the drink maker 10. The base 12 is not limited to polymeric material constructions or to the inclusion of the control buttons 16 on the front face. For example, the base 12 may be constructed of an aluminum material and have a touch screen control (not shown) exposed on its outer surface, as long as the materials and controls are able to withstand the normal operating conditions of the drink maker 10 and perform the typical functions of the drink maker 10, as are described below.

A jar 18 is removably mountable to the base 12 and includes a first recirculation surface 20. In the preferred embodiment, the jar 18 is constructed of a generally rigid polymeric material that is transparent. The jar 18 is not limited to being constructed of a transparent, polymeric material and may be constructed of nearly any material that is able to take on the general shape of the jar 18 and is able to withstand the normal operating conditions of the drink maker 10. The material of the jar 18 is preferably at least partially transparent such that a user is able to observe the processing or blending of foodstuff within the jar 18 during operation.

Referring to FIGS. 3-4B and 8, in the preferred embodiment, the jar 18 includes a lower skirt 22 comprised of a first wall 22a and a second wall 22b. The second wall 22b is preferably positioned radially outwardly relative to first wall 22a and the first and second walls 22a, 22b define a mounting gap 24 therebetween. The jar 18 preferably includes a plurality of support walls 26 (FIG. 4B) that extend between the first and second walls 22a, 22b in the mounting gap 24 to provide structural support and stiffness between the first and second walls 22a, 22b. The first and second walls 22a, 22b and support walls 26 are preferably integrally formed or molded into the jar 18. The jar 18 is not limited to the inclusion of the skirt 22, including the first and second walls 22a, 22b and the support walls 26 integrally formed therein or molded with the jar 18 and may be comprised of a conventional single-walled jar with a hole at its bottom. However, the jar 18 including the skirt 22 with the first and second walls 22a, 22b defining the mounting gap 24 is preferred for the drink maker 10 in order to mount the jar 18 to the base 12, as is described in greater detail below.

In the preferred embodiment, the base 12 includes an arcuate-shaped mounting wall 28 extending from a top surface 30. The mounting wall 28 is preferably positioned within the mounting gap 24 in the assembled configuration. In the preferred embodiment, the mounting wall 28 has a horseshoe-shape with a first end 28a and a second end 28b proximate a front of the base 12. A recirculation space 32 is formed between the first and second ends 28a, 28b of the mounting wall 28. The mounting wall 28 is not limited to having a horseshoe-shape or to including first and second ends 28a, 28b that define the recirculation space 32. The mounting wall 28 may have nearly any size or shape or alternative configuration that is able to withstand the normal operating conditions of the drink maker 10 and perform the desired functions of the mounting wall 28. In addition, the base 12 may be constructed without inclusion of the mounting wall 28 and the jar 18 may be otherwise mounted to the base 12.

The mounting wall 28 preferably includes an indent 34 and the first or second wall 22a, 22b of the jar 18 preferably includes a rib 36 that extends radially into the mounting gap 24. In the preferred embodiment, the mounting wall 28 includes a pair of indents or channels 34 formed on an inner surface and the first wall 22a of the skirt 22 and the jar 18 includes a pair of ribs 36 extending radially outwardly from an outer surface of the first wall 22a into the mounting gap 24. In the assembled configuration, the ribs 36 are positioned with the indents 34 and the mounting gap 24 encompasses the mounting wall 28 such that the jar 18 may only be mounted on the base 12 in a single orientation. The jar 18 is not limited to being mounted to the base 12 in a single orientation; however, the single orientation is preferred, as will be apparent from the below description of the drink maker 10.

The drink maker 10 is not limited to the inclusion of the pair of indents 34 on the inner surface of the mounting wall 28 or to the position or inclusion of the ribs 36 on the outer surface of the first wall 22a. For example, the second wall 22b may include a rib (not shown) that extends inwardly into the mounting gap 24 and engages an indent (not shown) on an outer surface of the mounting wall 28 to orient the jar 18 relative to the base 12. In addition, the base 12 and jar 18 may be constructed without any indents or ribs for orientation and may be exclusively oriented relative to each other by the mounting gap 24 and mounting wall 28 or nearly any other mechanism that is able to mount and/or orient the jar 18 relative to the base 12.

Referring to FIGS. 1-4B, in the preferred embodiment, a lid 38 is removably mountable to a mouth 18a of the jar 18 and a hatch 40 is movably mounted to the lid 38. The lid 38 and hatch 40 are preferably constructed of a polymeric material but are not so limited. The hatch 40 is preferably pivotally mounted to the lid 38 and is pivotable between a closed position (FIG. 3) and an open position (FIGS. 1 and 2) relative to the lid 38. When the lid 38 is mounted to the mouth 18a and the hatch 40 is in the closed position, the lid 38 and hatch 40 preferably seal the mouth 18a such that liquid, processed or blended foodstuff generally is unable to escape from the mouth 18a. In contrast, when the lid 38 is mounted to the mouth 18 and the hatch 40 is pivoted to the open position, the processed or blended foodstuff may be dispensed from the hole in the lid 38 exposed by opening the hatch 40. The lid 38 is not limited to the inclusion of the hatch 40 and the drink maker 10 is not limited to the inclusion of the lid 38. For example, the lid 38 may be solid such that it covers the entire mouth 18a when the lid 38 is mounted to the mouth 18a or the drink maker 10 may be operated without the lid 38, preferably, as long as the drink maker 10 is configured in a low speed such that processing foodstuff does not splash out of the mouth 18a or if the jar 18 is large enough or otherwise configured to contain the processing and splashing foodstuff during operation.

Referring to FIGS. 1-3A, in the preferred embodiment, the jar 18 includes the mouth 18a, a base end 18b and a channel 18c that extends between the mouth 18a and base end 18b. The channel 18c is preferably integrally formed in the jar 18 and is comprised of an arcuate-shaped channel or trough that extends radially outwardly relative to the remaining surfaces of the jar 18 or has a generally convex configuration. The front edge of the hatch 40 is preferably positioned over a top end of the channel 18c in the assembled configuration. Accordingly, when the hatch 40 is in the open position, blended or processed foodstuff may be poured from the jar 18 out of the hole in the lid 38 created by opening of the hatch 40. The blended or processed foodstuff is directed or channeled toward the hole by the channel 18c in the jar 18. The drink maker 10 is not limited to the inclusion of the channel 18c and may include a jar 18 without a channel or a channel having a different size, shape and/or configuration when compared to the above-described channel 18c.

Referring to FIGS. 1-4B and 8, in the preferred embodiment, a dispensing spout 42 is mounted to the jar 18 proximate the base end 18b and, preferably, on the channel 18c. The dispensing spout 42 preferably includes a dispensing head 42a, a dispensing pipe 42b that removably mounts the dispensing spout 42 to the jar 18, a spout mouth 42c where processed or blended foodstuff is dispensed and a spout lid 42d. An actuation lever or handle 44 is preferably mounted to the spout lid 42d and is movable between a dispensing position and a closed position. In the dispensing position, the dispensing spout 42 permits blended or processed foodstuff to flow through the dispensing spout 42 out of the spout mouth 42c and in the closed position, foodstuff is preferably blocked from flowing through the dispensing spout 42. The dispensing spout 42 is preferably constructed and operates in a manner similar to a dispensing spout described in U.S. patent application Ser. No. 11/051,573, which is incorporated herein by reference. U.S. patent application Ser. No. 11/051,573 was filed on Feb. 4, 2005 and is titled "Dispensing Blender." The structure and operation of the dispensing spout 42 are generally understood by one having ordinary skill in the art and are not described in further detail.

The jar 18 preferably includes a dispensing tube 46 extending outwardly from the channel 18c proximate the base end 18b. The dispensing spout 42 is preferably mounted to the dispensing tube 46 through the dispensing pipe 42b. The dispensing pipe 42b is preferably threadably mounted to the dispensing tube 46 such that a fluid seal is created between the dispensing tube 46 and the dispensing pipe 42b such that blended or processed foodstuff, typically in a fluid or slurry form, is able to flow through a conduit 48 formed by the dispensing pipe 42b and dispensing tube 46 and out of the spout mouth 42c when the actuation lever 44 is in the dispensing position. The dispensing spout 42 is not limited to being threadably mounted to the dispensing tube 46 in the channel 18c proximate the base end 18b and may be mounted nearly anywhere on the jar 18 such that foodstuff may be dispensed through the dispensing pipe 42b without removing the jar 18 from the base 12. In addition, the drink maker 10 is not limited to inclusion of the dispensing spout 42 and may be configured without the dispensing spout 42, similar to a conventional blender, as would be understood by one having ordinary skill in the art. Further, the dispensing spout 42 may be mounted to the jar 18 using nearly any mounting mechanism, for example, clamping, welding, mechanical fastening or nearly any other like mechanism that permits foodstuff to flow out of the jar 18 through the dispensing spout 42.

Referring to FIGS. 1-3A and 8, in the preferred embodiment, the base 12 includes a cup indentation 12a on a front side surface. The dispensing spout 42 is preferably positioned proximate the cup indentation 12a in the assembled configuration. The cup indentation 12a preferably has a convex, arcuate-shape and extends from a top to a bottom of the front side of the base 12. The cup indentation 12a preferably permits a user to position a generally cylindrical cup (not shown) beneath the dispensing spout 42 in the assembled configuration such that the foodstuff that is dispensed from the dispensing spout 42 flows directly into the cup below the spout mouth 42c. The base 12 is not limited to the inclusion of the cup indentation 12a and may have a generally continuous, planar or convex surface at its front side to permit a cup to be positioned under the dispensing spout 42. However, the cup indentation 12a is preferred to accommodate a conventional cup beneath the dispensing spout 42 and such that the extension of the dispensing spout 42 from the side surface of the jar 18 is limited to accommodate the cup.

Referring to FIGS. 2 and 3-5B, a processing cup 50 is removably mountable to the jar 18. When the processing cup 50 is mounted to the jar 18, the cup 50 and jar 18 comprise a container 52 in the assembled configuration. The processing cup 50 includes a second recirculation surface 54, defined by an exterior surface of a peripheral wall 50a of the processing cup 50, and is preferably constructed of a polymeric material that seals with the base end 18b of the jar 18 such that fluids and processing foodstuff do not leak from the container 52 in the assembled configuration. The processing cup 50 is not limited to polymeric material constructions and may be constructed of a metallic or other generally rigid material that is able to perform the typical functions of the processing cup 50 and withstand the normal operating conditions of the processing cup 50.

In the preferred embodiment, the processing cup 50 includes the peripheral wall 50a with a hole 56 therein and a base surface 50b. The base surface 50b preferably includes a groove 58 that pitches downwardly toward a bottom apex 56a of the hole 56. The peripheral wall 50a preferably extends generally perpendicularly from the base surface 50b to a top edge 50d thereof and has a generally cylindrical shape. The peripheral wall 50a is not limited to extending generally perpendicularly from the base surface 50b or to having a generally cylindrical shape and may have nearly any shape or orientation that permits the processing cup 50 to perform its intended functions and is able to withstand the normal operating conditions of the processing cup 50.

Figure 3A:
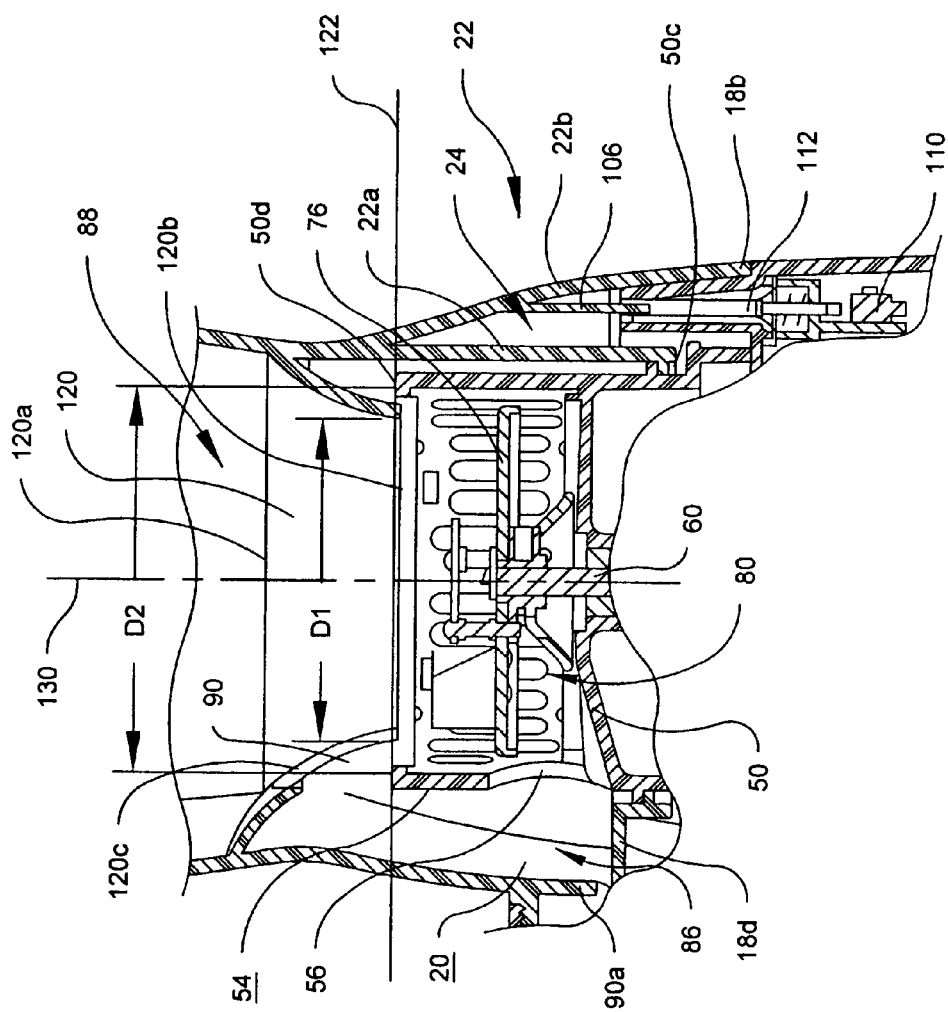
FIG. 3A is a magnified portion of the cross-sectional view of FIG. 3, showing a jar and a processing cup of the drink maker of FIG. 1.
Figure 4A:
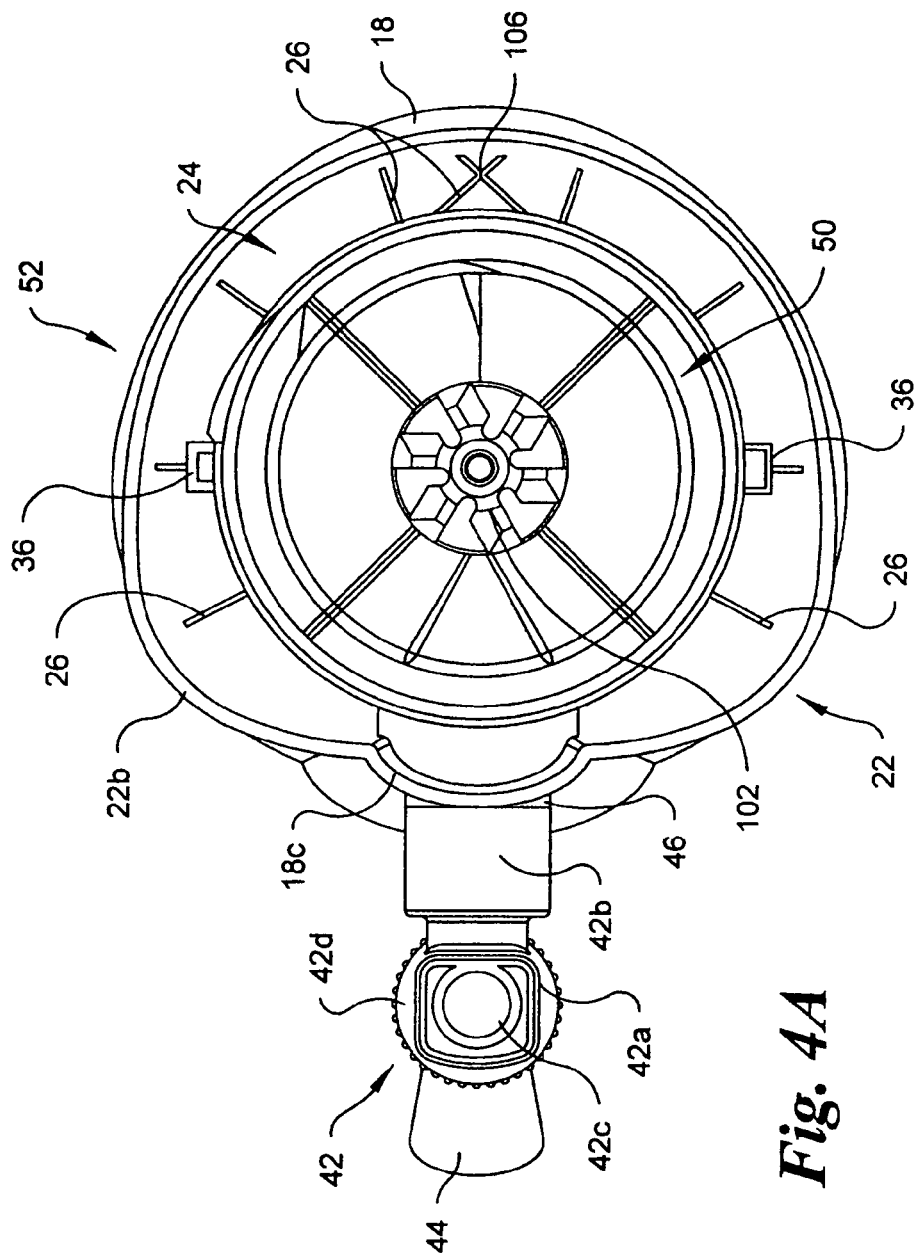
FIG. 4A is a bottom plan view of a container comprised of a processing cup mounted to a jar of the drink maker shown in FIG. 1.
Figure 4B:
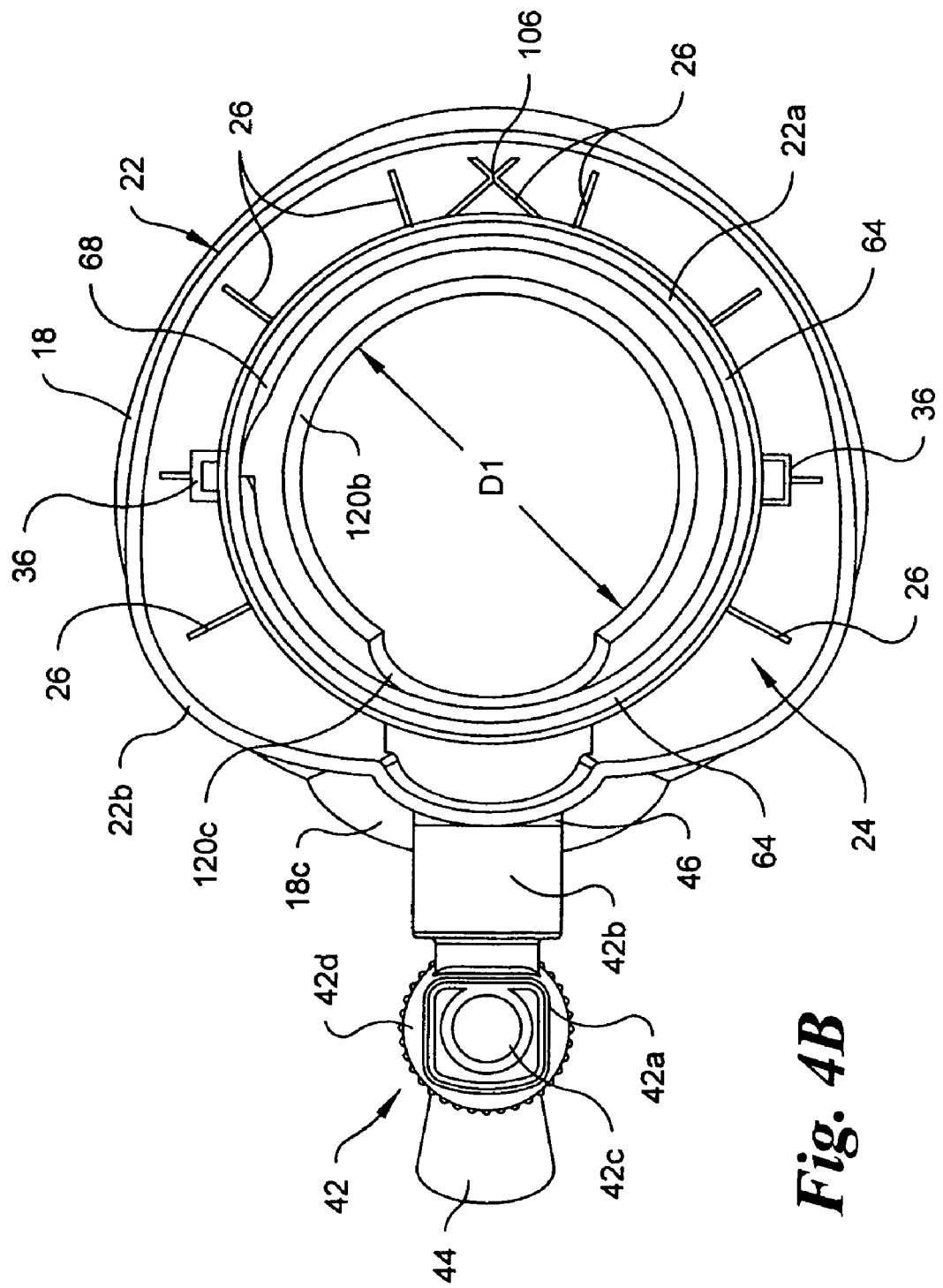
FIG. 4B is a bottom plan view of the jar and an attached dispensing spout of the drink maker shown in FIG. 1.
Figure 5A:
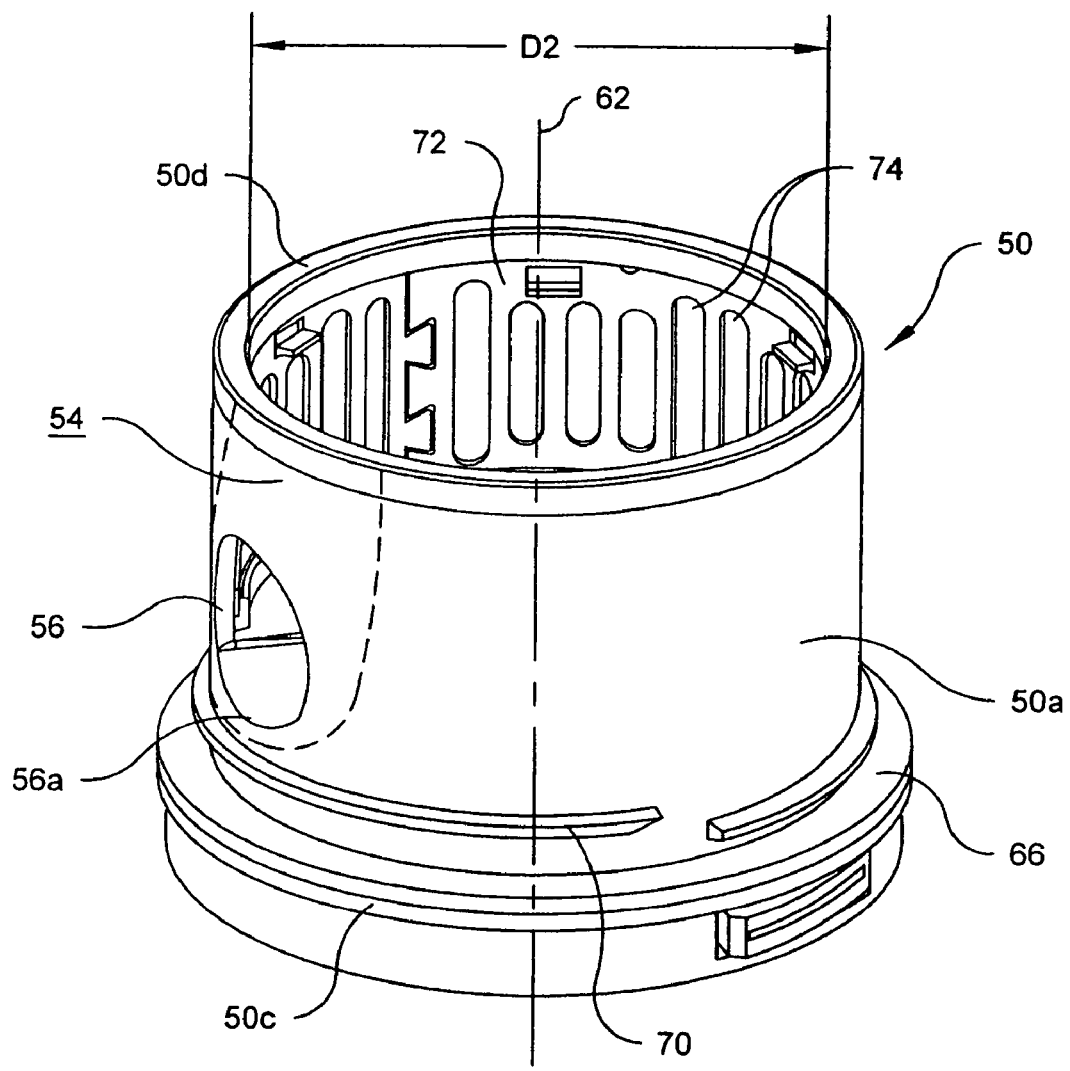
FIG. 5A is a side perspective view of the processing cup of the drink maker show in FIG. 1.
Figure 5B:
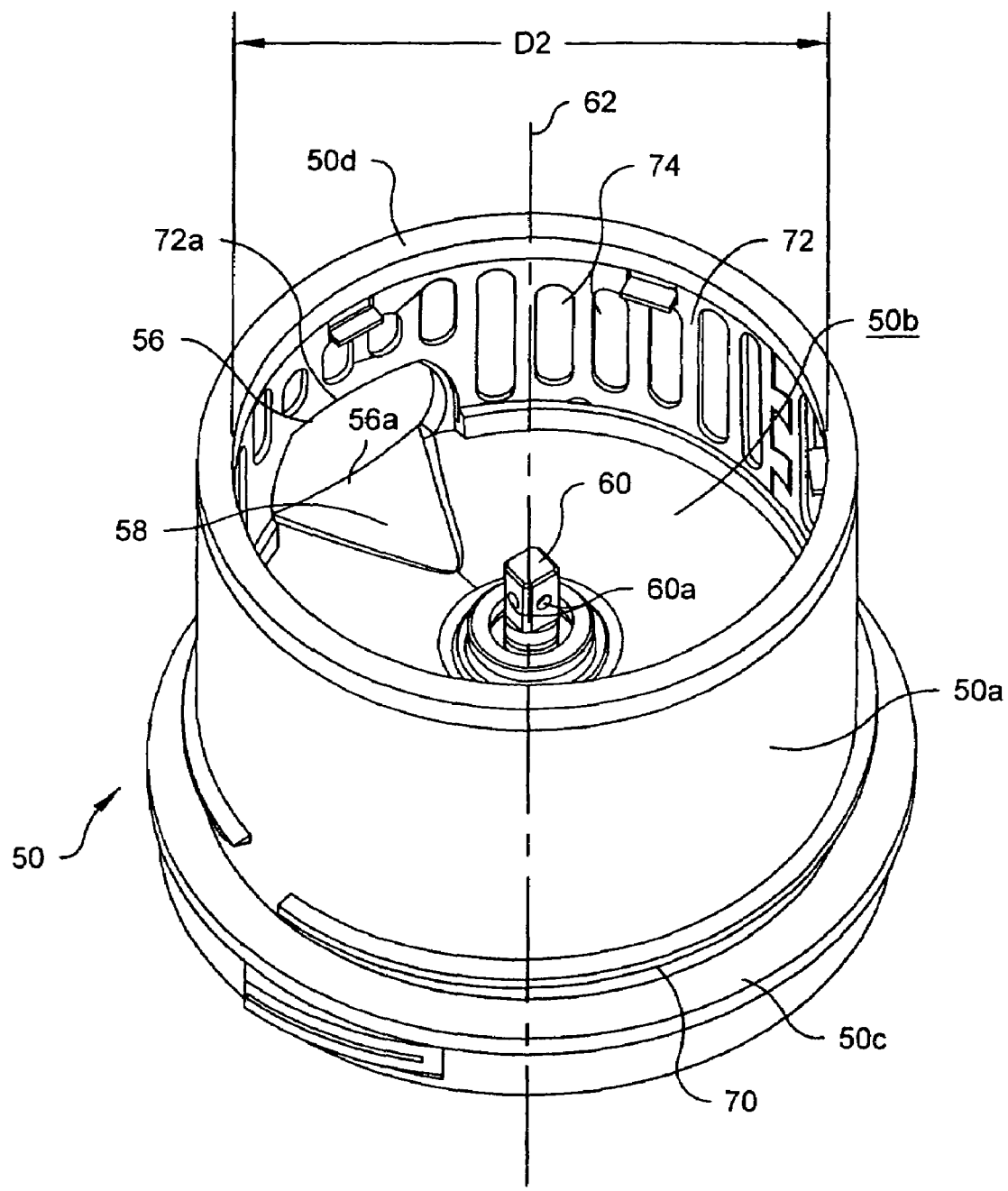
FIG. 5B is a top perspective view of the processing cup of the drink maker shown in FIG. 1.

Referring to FIG. 5B, the processing cup 50 also includes a cup drive shaft 60 that extends through the base surface 50b and is positioned on a cup axis 62. The cup drive shaft 60 preferably extends generally perpendicularly relative to the base surface 50b and is rotatably mounted in the processing cup 50. As seen in FIGS. 3 and 3A, the top edge 50d of the peripheral wall 50a extends above the cup drive shaft 60. The cup drive shaft 60 preferably has a square cross-section at its top with one or more mounting divots 60A on planar side surfaces of the cup drive shaft 60. The groove 58 preferably has a semi-conical shape and extends from a point in the base wall 50b proximate the cup drive shaft 60 to the hole 56. The groove 58 provides a surface for blended or processed foodstuff to slide toward and out of the hole 56 in the operating configuration. That is, gravity preferably urges foodstuff positioned on the groove 58 toward the bottom apex 56A of the hole 56.

Referring to FIGS. 2, 5A and 5B the processing cup 50 also preferably includes a radially, outwardly extending platform 50c that preferably extends generally radially, outwardly and perpendicularly relative to a side surface of the peripheral wall 50a. The jar 18 includes a sealing edge 64 at a terminal edge of the first wall 22a at the base end 18b. In the assembled configuration of the container 52, the sealing edge 64 engages the platform 50c to seal the container 52. Specifically, in the preferred embodiment, a gasket 66 is positioned between the sealing edge 64 and the platform 50c to seal the container 52 such that fluid or other foodstuff within the container 52 does not leak between the jar 18 and processing cup 50 or, specifically, between the sealing edge 64 and the platform 50c. Accordingly, liquid foodstuff may be inserted into the container 52 through the mouth 18a when the processing cup 50 is secured to the jar 18, generally without leaking from the container 52.

Referring to FIGS. 2-5B, in the preferred embodiment, the processing cup 50 is mounted to the jar 18 by engaging external threads 70 on the side surface of the peripheral wall 50a with internal threads 68 on an inner side surface of the first wall 22a. The processing cup 50 is not limited to being threadably mounted to the jar 18 using the internal and external threads 68, 70 and may be secured to the jar 18 by clamping, mechanical fastening, adhesive bonding, integral molding or nearly any other securing mechanism or method that secures the processing cup 50 to the jar 18 to form the container 52 in the assembled configuration.

Referring to FIGS. 2 and 5A, the gasket 66 is preferably constructed of a generally flexible, resilient material and has a relatively thin, ring-shape that is able to slide over the outer surfaces of the peripheral wall 50a and the external threads 70 for positioning on the platform 50c. The gasket 66 is preferably constructed of a material that flexes when it is compressed between the sealing edge 64 and the platform 50c to create a liquid-tight seal between the sealing edge 64 and the platform 50c. For example, the gasket 66 may be constructed of a rubber material but is not so limited.

Referring to FIGS. 2, 5A and 5B, the processing cup 50 preferably includes a generally cylindrical cutting blade 72 secured to an inner surface of the peripheral wall 50a of the cup 50. Specifically, in the preferred embodiment, the cutting blade 72 is fixedly mounted to an inner surface of the peripheral wall 50a. The cutting blade 72 is not limited to being fixedly mounted to the peripheral wall 50a and may be removable therefrom for cleaning purposes. The cutting blade 72 preferably includes an arc-shaped slot 72a therein to accommodate the hole 56 in the peripheral wall 50a. The cutting blade 72 is preferably constructed of a metallic, sheet material and includes a plurality of generally narrow, oblong-shaped grating slots 74 therein that are able to cut, process or grate foodstuff that is urged against the cutting blade 72. A longitudinal axis of the grating slots 74 is preferably parallel with the cup axis 62. The cutting blade 72 is not limited to inclusion of the arc-shaped slot 72a, metallic sheet constructions or to the inclusion of the narrow, oblong-shaped grating slots 74. For example, the cutting blade 72 may have a continuous, cylindrical shape or other shape that mates with the inner surface of the peripheral wall 50a, a generally rigid polymeric construction and raised ribs (not shown) that cut, pummel or otherwise process foodstuff that is forced against the ribs.

Referring to FIGS. 2, 3 and 5A-7, in the preferred embodiment, an impeller 76 is removably and rotatably mounted to the processing cup 50 within the peripheral wall 50a. The impeller 76 preferably has a disk-shape and includes a first surface 76a and a second surface 76b. As seen in FIGS. 3 and 3A, the impeller 76 is completely below the top edge 50d of the peripheral wall 50a of the processing cup 50. The impeller 76 also preferably includes a mounting fitting 78 mounted to the second surface 76b with a generally square hole 78a extending therethrough. The impeller 76 is removably mountable to the cup drive shaft 50 by inserting the cup drive shaft 60 into the complimentary square hole 78a in the mounting fitting 78. In addition, the mounting fitting 78 includes a pin 78b that is biased to extend into the square hole 78a. In the mounted position, the pin 78b engages one of the mounting divots 60a to secure the impeller 76 to the cup drive shaft 60. The impeller 76 is preferably removable from the cup drive shaft 60 by applying a force to the impeller 76 upwardly relative to the base surface 50b, which causes the shape of the divots 60a to urge the pin 78b out of the square hole 78a against the bias force and releases the impeller 76 from the cup drive shaft 60. The impeller 76 is not limited to the inclusion of the mounting fitting 78 or to the above-described removable mounting of the impeller 76 to the cup drive shaft 60. For example, the impeller 76 may be clamped, threaded, adhesively bonded or otherwise secured to the cup drive shaft 60 as long as the impeller 76 is able to engage the cup drive shaft 60 such that the impeller 76 rotates when the cup drive shaft 60 rotates and the engagement is able to withstand the normal operating conditions of the impeller 76.

Referring to FIG. 3, in the preferred embodiment, the second surface 76b of the impeller 76 faces the base surface 50b of the processing cup 50 in the assembled configuration and the second surface 76b, the base surface 50b and an inner surface of the peripheral wall 50a define a receiving chamber 80. The receiving chamber 80 receives foodstuff beneath the impeller 76 that is processed by the cutting blade 72 or flows past the impeller 76 within the container 52. The foodstuff within the receiving chamber 80 is urged toward the bottom apex 56a of the hole 56 by the groove 58.

Figure 6:
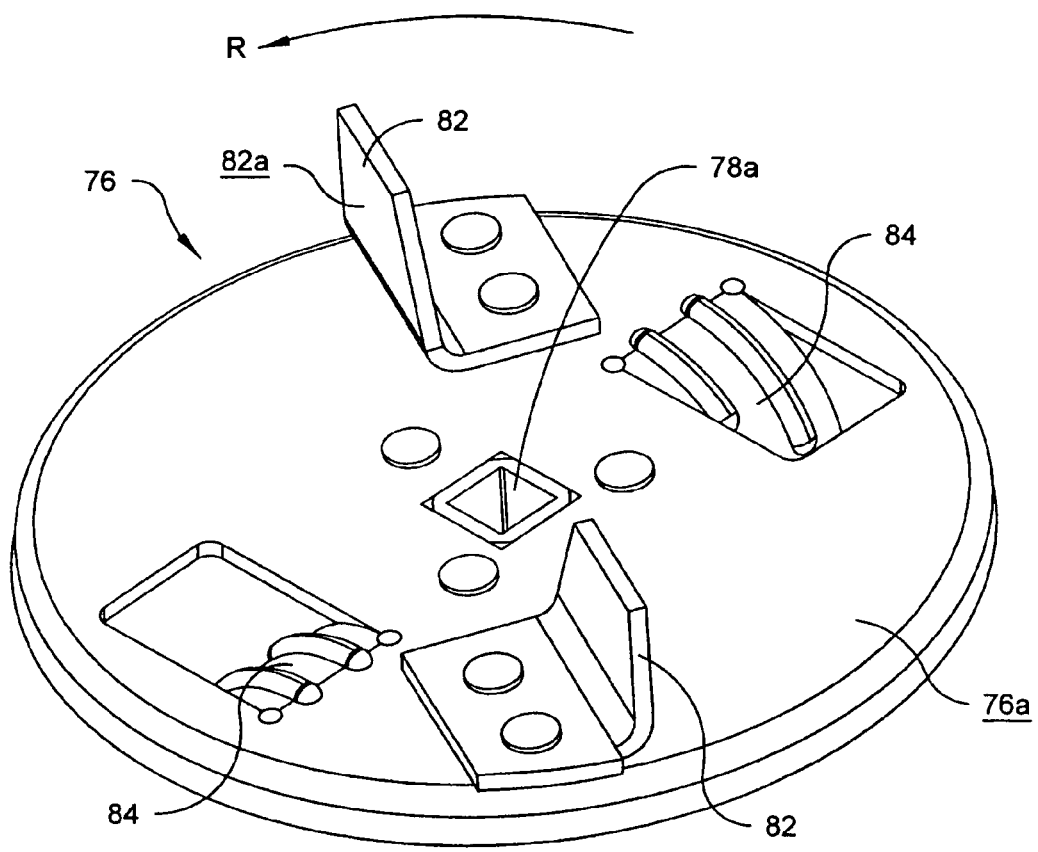
FIG. 6 is a top perspective view of an impeller of the drink maker shown in FIG. 1.
Figure 7:
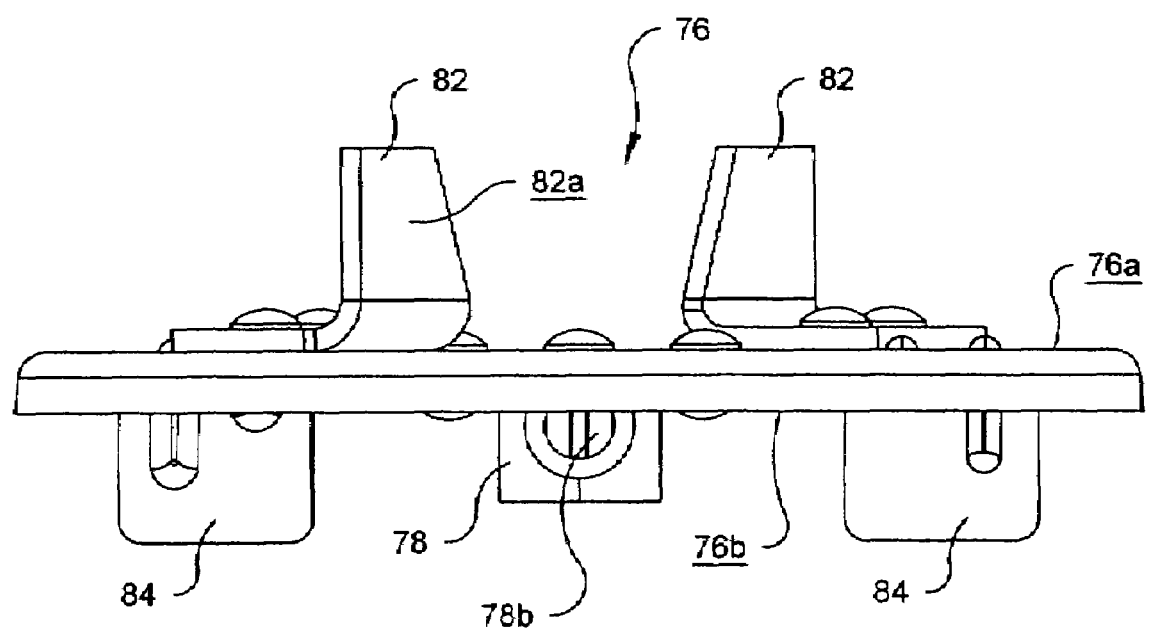
FIG. 7 is a front elevational view of the impeller shown in FIG. 6 of the drink maker shown in FIG. 1.
Figure 8:
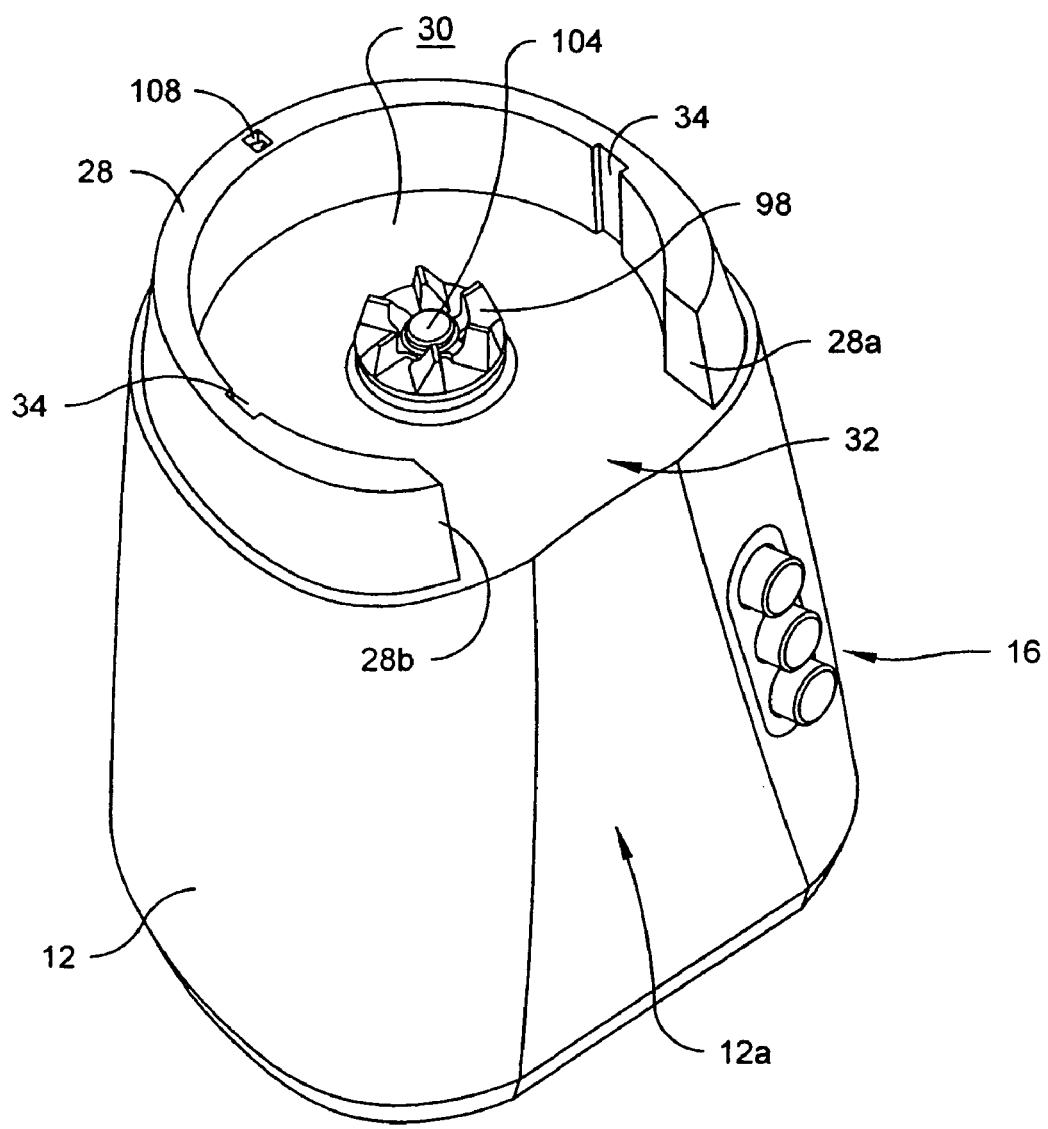
FIG. 8 is a top perspective view of a base of the drink maker shown in FIG. 1.

Referring to FIGS. 6 and 7, the impeller 76 preferably includes at least one grinding tooth 82 extending generally perpendicularly from the first surface 76a and at least one urging tooth 84 extending generally perpendicularly from the second surface 76b. Preferably, the impeller 76 includes a pair of grinding teeth 82 positioned at diametrically opposed locations on the first surface 76a proximate a periphery of the impeller 76 and a pair of urging teeth 84 also positioned at diametrically opposed peripheral locations. The urging teeth 84 are preferably integrally formed with the impeller 76 by cutting three sides of the urging blade 84 from the impeller 76 and bending the middle edge below the second surface 76b. The impeller 76 is preferable constructed of a metal material that is able to accommodate the cutting and bending of the urging teeth 84. The impeller 76 is not limited to metal constructions and may be constructed of an injection molded polymeric material or other material that is able to withstand the normal operating conditions of the impeller 76 and take on the general shape of the impeller 76. In addition, the urging teeth 84 are not limited to being integrally formed with the impeller 76 and may be separately mounted to the impeller 76. The grinding teeth 82 are preferably constructed of L-shaped pieces of metal with one leg fixed to the impeller 76 and the other leg extending generally perpendicularly from the first surface 76a. The grinding teeth 82 are not limited to metal constructions nor to having a L-shape and may be integrally formed with the impeller 76 similar to the grinding teeth 84 or may be otherwise constructed as long as the grinding teeth 82 are able to withstand the normal operating conditions of the impeller 76 and take on the general shape and function of the grinding teeth 82.

The grinding teeth 82 preferably include driving faces 82a that are oriented generally perpendicularly to a rotation direction R of the impeller 76. Specifically, the driving faces 82a are preferably formed on the upstanding leg of the grinding teeth 82 and are positioned proximate the periphery of the impeller 76. In the assembled configuration, when the impeller 76 is urged to rotate by the cup drive shaft 60, the driving faces 82a urge foodstuff to rotate in the rotation direction R and to impact the cutting blade 72.

Referring to FIGS. 3, 6 and 7, the urging teeth 84 are positioned behind the grinding teeth 82 relative to the rotation direction R of the impeller 76 in the preferred embodiment. In the assembled configuration, the urging teeth 84 extend into the receiving chamber 80 and urge foodstuff in the receiving chamber 80 to rotate in the rotation direction R and outwardly toward the inner surface of the peripheral wall 50a. Further the urging teeth 84 urge the foodstuff toward and out of the hole 56 in the peripheral wall 50a. Although integrally forming the urging teeth 84 with the impeller 76 typically creates a hole or penetration through the first surface 76a to the second surface 76b, foodstuff typically does not enter the receiving chamber 80 through the penetration during operation. Specifically, the impeller 76 typically rotates at a high enough speed and the urging teeth 84 are positioned a relatively small distance behind the grinding teeth 82 and, specifically, the driving face 82A, such that foodstuff generally does not move vertically through the penetration created by the urging teeth 84.

Referring to FIGS. 2, 3 and 5A, a recirculation chamber 86 is defined in the drink maker 10 by the first recirculation surface 20 of the jar 18 and the second recirculation surface 54 of the processing cup 50. The jar 18 preferably includes a recirculation base 18d that extends generally perpendicularly from the channel 18c proximate a lower edge of the dispensing tube 46 to the first wall 22a. The recirculation base 18d preferably forms a base of the recirculation chamber 86 and permits the sealing edge 64 to be continuous such that fluid does not leak between the sealing edge 64 and the platform 50c or out of the container 52. The recirculation chamber 86 is also preferably formed or positioned proximate the hole 56 in the assembled configuration such that the receiving chamber 80 is in fluid communication with the recirculation chamber 86. In the preferred embodiment, a gap is formed between an outer surface of the peripheral wall 50a and an inner surface of the jar 18 around an entire periphery of the peripheral wall 50b. Accordingly, the inner surface of the jar 18 preferably does not seal with or touch the outer surface of the peripheral wall 50a and the jar 18 seals with the processing cup 50 at the sealing edge 64 and the platform 50c. However, the drink maker 10 is not limited to the inclusion of the gap between the peripheral wall 50a and the inside surface of the jar 18 and the inner surface of the jar 18 may contact and/or seal with the outer surface of the peripheral wall 50a as long as the recirculation chamber 86 is formed proximate the hole 56.

In the preferred embodiment, a grinding chamber 88 is defined by an inner surface of the jar 18, the impeller 76 and an inner surface of the peripheral wall 50a. The grinding chamber 88 preferably encompasses a significant portion of the volume of the container 52 for receiving foodstuff therein. Specifically, when foodstuff is introduced into the container 52 in the assembled configuration, the foodstuff is introduced into the grinding chamber 88 such that a majority of the foodstuff is positioned on or above the impeller 76 in preparation for processing, blending or grinding.

Referring to FIGS. 3, 5A and 5B, in the preferred embodiment, the peripheral wall 50a includes the top edge 50d. A recirculation opening 90 is defined between the top edge 50d and the channel 18c. The recirculation chamber 86 is in fluid communication with the grinding chamber 88 through the recirculation opening 90. Accordingly, foodstuff may circulate within the container 52 between the receiving chamber 80 and recirculation chamber 86 through the hole 56 and from the recirculation chamber 86 into the grinding chamber 88 through the recirculation opening 90. The recirculation chamber 86 is not limited to being in fluid communication with the grinding chamber 88 through the recirculation opening 90 and may be in communication with the grinding chamber 88 through a separate conduit (not shown) or nearly any other opening that permits fluid communication between the recirculation chamber 86 and grinding chamber 88.

Referring to FIGS. 3-5B, in the preferred embodiment, the jar 18 includes a recirculation rib 120 that extends radially inwardly from an inner surface of the jar 18. The recirculation rib 120 may be integrally molded, fixed or removably mounted to the inner surface of the jar 18. The recirculation rib 120 preferably has a funnel-shape and includes a root end 120a and a distal end 120b. The root end 120a is preferably integrally molded or in facing engagement with the inner surface of the jar 18 and the distal end 120b is preferably positioned radially inwardly toward a longitudinal axis 130 of the drink maker 10 in an assembled configuration. The distal end 120b preferably defines a first diameter D1. The recirculation rib 120 also preferably includes a recirculation hole 120c that is generally aligned with the recirculation opening 90 in the assembled configuration. A second diameter D2 is defined by the top edge 50d of the peripheral wall that is preferably greater than the first diameter (D2>D1). The first diameter D1 is approximately seventy-five to ninety-five percent (75%-95%) of the second diameter D2 in the preferred embodiment.

Referring to FIGS. 3-7, in the preferred embodiment, the distal end 120b of the recirculation rib 120 is positioned radially inwardly from the top edge 50d of the peripheral wall 50a in an assembled configuration relative to the longitudinal axis 130 of the drink maker 10. In addition, the distal end 120b and the top edge 50d are preferably positioned on a generally horizontal recirculation plane 122 in the assembled configuration or the distal end 120d is positioned slightly below the recirculation plane 122 to extend within the peripheral wall 50a of the processing cup 50. The funnel-shaped recirculation rib 120 urges foodstuff within the jar 18 toward the first surface 76a of the impeller 76 and promotes recirculation of the mixing foodstuff between the receiving, recirculation and grinding chambers 80, 86, 88 in operation, as is described in greater detail below.

Referring to FIGS. 1-4B, in the preferred embodiment, the dispensing spout 42 is in fluid communication with the recirculation chamber 86 through the conduit 48. The dispensing spout 42 may be actuated to the dispensing position to dispense foodstuff from the recirculation chamber 86 or may be actuated to the closed position to block foodstuff from flowing out of the container 52. In the preferred embodiment, the dispensing spout 42 is actuated between the dispensing and closed positions by operating the actuation lever 44.

Referring to FIGS. 2 and 3, in the preferred embodiment, the channel 18c defines a pour spout 96 proximate the mouth 18a. The pour spout 96 permits pouring of foodstuff from the container 52. Foodstuff is also directed to the hole in the lid 38 by the spout 96 when the hatch 40 is in the open position and the lid 38 is mounted to the mouth 18a. The channel 18c preferably channels, urges or directs foodstuff along the channel 18c toward the pour spout 96 such that the stream of foodstuff flowing out of the pour spout 96 is consolidated such that spills are typically limited or prevented when pouring foodstuff from the container 52.

Referring to FIG. 3, the dispensing tube 46 is preferably in fluid communication with the recirculation chamber 86 through a recirculation outlet 90a. The recirculation outlet 90a permits the flow of fluid from the recirculation chamber 86 into the conduit 48 and into the dispensing spout 42.

Referring to FIGS. 3-4B and 8, a safety rod 106 preferably extends downwardly into the mounting gap 24 in the skirt 22. In addition, the mounting wall 28 preferably includes an aperture 108 on its top surface. A microswitch 110 and a sliding rod 112 that is biased to an upward resting position by a spring (not shown) are mounted beneath the aperture 108 in the base 12. In the assembled configuration, the safety rod 106 is positioned within the aperture 108, contacts the sliding rod 112 forcing it toward the microswitch 110 against the spring bias and activates the microswitch 110 such that power is provided to the motor 14. If the safety rod 106 is not positioned within the aperture 108 to move the sliding rod 112 and actuate the microswitch 110, power will not be provided to the motor 14 and the drink maker 10 will not operate. Accordingly, the processing cup 50 may not be positioned on the top surface 30 without being engaged with the jar 18 such that the motor 14 drives the impeller 76, because the motor 14 is not powered unless the jar 18 is properly positioned on the base 12 such that the safety rod 106 actuates the microswitch 110. The drink maker 10 is not limited to the inclusion of the microswitch 110, sliding rod 112 and the safety rod 106 and the drink maker 10 generally operates without these safety components; however, these features are preferred to limit the exposure of a user to rotating parts of the drink maker 10.

Referring to FIGS. 1-8, in operation, the drink maker 10 is assembled by positioning the gasket 66 on the platform 50c and urging the top edge 50d into the base end 18b of the jar 18 such that the peripheral wall 50a is positioned radially inwardly from the inner surfaces of the jar 18. The impeller 76 is mounted on the cup drive shaft 60 and the pin 78b of the mounting fitting 78 engages one of the mounting divots 60a. The processing cup 50 is secured to the jar 18 by engaging the external threads 70 on the peripheral wall 50a with the internal threads 68 on the first wall 22a such that the gasket 66 is sandwiched between the sealing edge 64 and the platform 50c. The dispensing spout 42 is threadably engaged with the dispensing tube 46 and the lid 38 is engaged with the mouth 18a. The container 52 is positioned on the base 12 by positioning the mounting gap 24 over the mounting wall 28 to orient the container 52 relative to the base 12. In the assembled configuration, the dispensing spout 42 is positioned proximate the cup indentation 12a and the safety rod 106 is located in the aperture 108. In addition, when the mounting wall 28 is positioned in the mounting gap 24, the ribs 36 engage the indents 34 on the mounting wall 28 to generally prevent rotational movement of the container 52 relative to the base 12. Further, the distal end 120b of the recirculation rib 120 is positioned on or slightly below the recirculation plane 122 with respect to the top edge 50d of the peripheral wall 50a and the recirculation hole 120c is generally aligned with the recirculation opening 90. The base clutch 98 engages the cup clutch 102 on the base 12 to rotatably couple the motor 14 to the impeller 76. The motor 14 is directed to operate by depressing one of the control buttons 16 causing the drive shaft 104, base clutch 98, cup clutch 102, cup drive shaft 60 and impeller 76 to rotate.

In the assembled configuration, the lid 38 may be removed from the mouth 18a or the hatch 40 may be opened for the introduction of foodstuff into the grinding chamber 88. In the grinding chamber 88, relatively large chunks of foodstuff typically rest on or above the impeller 76. The recirculation rib 120 funnels the foodstuff onto the first surface 76a of the impeller 76, generally directing the foodstuff away from the recirculation chamber 86. The drink maker 10 is actuated to operate by depressing one of the control buttons 16 and the grinding teeth 82 urge the foodstuff into the cutting blade 72. A vortex is generally prevented from forming within the grinding chamber 88 because of the overhang of the distal end 120b relative to the top edge 50d of the peripheral wall 50a. That is, if the recirculation rib 120 were not included in the jar 18 the rotating foodstuff may have a tendency to flow upwardly along the inner surface of the jar 18, thereby potentially creating a vortex. However, the inclusion of the recirculation rib 120 preferably blocks the vortex from forming by creating a downward pressure on the rotating foodstuff, urging the foodstuff to flow downwardly from the grinding chamber 88 into the receiving chamber 80. In addition, the recirculation rib 120 generally blocks rotating foodstuff from climbing the inner walls of the jar 18 by overhanging the recirculation chamber 86. The foodstuff or large chunks of the foodstuff are processed, ground or blended by the cutting blade 72 and small or liquid foodstuff flows or is urged into the receiving chamber 80 between a peripheral edge of the impeller 76 and the cutting blade 72. The foodstuff is continuously urged into the cutting blade 72 during operation of the drink maker 10 by the driving faces 82a of the grinding teeth 82. When the foodstuff flows into the receiving chamber 80, the urging teeth 84 urge the foodstuff against the inside surface of the peripheral wall 50a and through the hole 56 into the recirculation chamber 86. The rotating foodstuff is generally blocked from moving upwardly back into the grinding chamber 88 by the downward pressure applied by the foodstuff in the grinding chamber 88 and generally pursues a flow path of least resistance through the recirculation outlet 90a. If the dispensing spout 52 is in the closed position, the foodstuff in the recirculation chamber 86 is urged upwardly through the recirculation opening 90 and the recirculation hole 120c and preferably flows back into the grinding chamber 88 for further processing, grinding or blending. If the dispensing spout 42 is in the open position, the foodstuff in the recirculation chamber 86 is urged through the recirculation outlet 90a, into the conduit 48 and out of the spout mouth 42c. A user typically positions a cup (not shown) in the cup indentation 12a such that the foodstuff flows into the cup. When the cup is sufficiently filled with processed or ground foodstuff, the actuation lever 44 is moved to actuate the dispensing spout 42 into the closed position. Foodstuff may be dispensed from the dispensing spout 42 when the impeller 76 is rotating or when the drink maker 10 is not operating.

It will be appreciated by those skilled in the art that changes could be made to the embodiment described above without departing from the broad inventive concept thereof. It is understood, therefore, that this invention is not limited to the particular embodiment disclosed, but is intended to cover modifications within the spirit and scope of the present invention as defined by the appended claims.

We claim:

1. A drink maker for processing foodstuff and dispensing the processed foodstuff therefrom, the drink maker comprising:
   a base enclosing a motor;
   a jar removably mountable to the base, the jar including a first recirculation surface;
   a processing cup removably mountable to the jar, the processing cup including a base surface, a generally cylindrical-shaped peripheral wall extending generally perpendicularly from the base surface to a top edge thereof and a drive shaft extending through the base surface, the processing cup and jar comprising a container in an assembled configuration, the processing cup including a second recirculation surface defined by an exterior surface of the peripheral wall; and a recirculation chamber defined by the first recirculation surface and the second recirculation surface, wherein the top edge of the peripheral wall extends above the drive shaft.

2. The drink maker of claim 1 further comprising:

an impeller removably and rotatably mounted to the processing cup, the processing cup including a receiving chamber defined by the base surface, the peripheral wall and the impeller.

3. The drink maker of claim 2 wherein the peripheral wall includes a hole therein, the receiving chamber in fluid communication with the recirculation chamber through the hole.

4. The drink maker of claim 3 further comprising:

a grinding chamber defined by an inner surface of the jar, the impeller and an inner surface of the peripheral wall; and a channel extending along a length of the jar, a recirculation opening defined between the top edge and the channel, the recirculation chamber in fluid communication with the grinding chamber through the recirculation opening.

5. The drink maker of claim 1 further comprising:

a generally cylindrical cutting blade mounted to an inner surface of the peripheral wall of the processing cup, the cutting blade including a plurality of grating slots.

6. The drink maker of claim 1 further comprising:

a dispensing spout mounted to the jar and being in fluid communication with the recirculation chamber, the dispensing spout movable between an open position to dispense foodstuff and a closed position to block foodstuff from flowing out of the container.

7. The drink maker of claim 1 wherein the jar includes a lower skirt comprised of a first wall and a second wall, the second wall positioned radially outwardly from the first wall, the first and second walls defining a mounting gap therebetween.

8. The drink maker of claim 7 wherein the base includes an arcuate-shaped mounting wall extending from a top surface, the mounting wall positioned within the mounting gap in the assembled configuration.

9. The drink maker of claim 8 wherein the mounting wall includes an indent and one of the first and second walls includes a rib extending radially into the mounting gap, the rib positioned within the indent in the assembled configuration.

10. The drink maker of claim 1 wherein the peripheral wall includes a hole therein, the base surface including a groove that pitches downwardly toward a bottom apex of the hole.

11. The drink maker of claim 1 wherein the jar includes a sealing edge and the processing cup includes a radially outwardly extending platform, the sealing edge engaging the platform to seal the container.

12. The drink maker of claim 11 further comprising:

a gasket positioned between the sealing edge and the platform.

13. The drink maker of claim 11 wherein the jar includes a lower skirt comprised of a first wall and a second wall, the second wall positioned radially outwardly relative to the first wall, the sealing edge comprised of a terminal end of the first wall.

14. The drink maker of claim 1 further comprising:

a lid removably mountable to a mouth of the jar, the lid including a movable hatch.

15. The drink maker of claim 1 further comprising:

a dispensing spout mounted to the jar, the base including a cup indentation on a side surface, the dispensing spout positioned proximate the cup indentation in the assembled configuration.

16. The drink maker of claim 1 further comprising:

an impeller removably and rotatably mounted to the processing cup, the impeller having a generally disc-shape including a first surface and a second surface.

17. The drink maker of claim 16 wherein the second surface faces the base surface in the assembled configuration, the second surface, base surface and an inner surface of the processing cup further defining a receiving chamber.

18. The drink maker of claim 17 wherein the impeller includes at least one grinding tooth extending generally perpendicularly from the first surface and at least one urging tooth extending generally perpendicularly from the second surface, the at least one urging tooth being integrally formed from a portion of the impeller.

19. The drink maker of claim 18 wherein the at least one grinding tooth comprises a first grinding tooth and a second grinding tooth, the first and second grinding teeth positioned proximate a periphery of the impeller and including driving faces that are oriented generally perpendicularly to a rotation direction of the impeller.

20. The drink maker of claim 18 wherein the at least one urging tooth comprises a first urging tooth and a second urging tooth extending from the impeller toward the base surface in the assembled configuration, the first and second urging teeth positioned behind the first and second grinding teeth relative to a direction of rotation of the impeller.

21. The drink maker of claim 1 wherein the jar includes a funnel-shaped recirculation rib extending radially, inwardly from an inner surface of the jar and an arcuate-shaped channel extending generally between a mouth and a base end of the jar, wherein the channel extends radially outwardly relative to remaining surfaces of the jar.

22. The drink maker of claim 21 wherein the recirculation rib includes a root end and a distal end, a first diameter defined by the distal end, the top edge of the peripheral wall defining a second diameter.

23. The drink maker of claim 22 wherein the first diameter is approximately seventy-five to ninety-five percent of the second diameter.

24. The drink maker of claim 22 wherein the first diameter is less than the second diameter and the distal end of the recirculation rib is positioned radially inwardly from the top edge of the peripheral wall in an assembled configuration relative to a longitudinal axis of the drink maker to inhibit the formation of a vortex in the jar during operation.

25. The drink maker of claim 24 wherein the distal end and the top edge are positioned on a generally horizontal recirculation plane in the assembled configuration.

26. A drink maker for processing foodstuff and dispensing the processed foodstuff therefrom, the drink maker comprising:

a base enclosing a motor, the base including an arcuate-shaped mounting wall extending from a top surface;

a processing cup removably mountable to the base, the processing cup including a base surface and a generally cylindrical-shaped peripheral wall extending generally perpendicularly from the base surface to a top edge thereof;

a generally cylindrical cutting blade mounted to an inner surface of the peripheral wall of the processing cup;

an impeller positioned within the processing cup and completely below the top edge of the peripheral walk; and a jar removably mountable to the processing cup, the jar including a mouth, a base end and a skirt proximate the base end, the skirt including a first wall and a second wall, the second wall positioned radially outwardly from the first wall, the first and second walls defining a mounting gap therebetween, the mounting wall positioned in the mounting gap in an assembled configuration.

27. The drink maker of claim 26 wherein the processing cup includes a platform located radially outwardly from the peripheral wall, the first wall including a sealing edge proximate the base end, the sealing edge positioned proximate the platform in the assembled configuration.

28. The drink maker of claim 27 further comprising:

a gasket located between the sealing edge and platform to seal the base end to the processing cup in the assembled configuration.

29. The drink maker of claim 27 wherein the processing cup includes a hole in the peripheral wall, the jar including a channel with a recirculation base proximate the base end, the recirculation base extending between the first wall and the second wall, the jar including a first recirculation surface and the peripheral wall including a second recirculation surface, the first recirculation surface being located in the channel, the first and second recirculation surfaces and the recirculation base defining a recirculation chamber.

30. The drink maker of claim 29 wherein the channel extends from the mouth to the base end and defines a pour spout proximate the mouth.

31. The drink maker of claim 29 wherein the mounting wall includes a first end, a second end and a recirculation space between the first and second ends, the recirculation chamber positioned in the recirculation space in the assembled configuration.

32. The drink maker of claim 29 wherein the jar includes a dispensing tube extending from the channel proximate the base end, the dispensing tube being in fluid communication with the recirculation chamber through a recirculation outlet, a dispensing spout being removably mountable to the recirculation tube.

* * * * *